3 Sheets—Sheet 1.
H. THOMPSON.
TENONING MACHINE.
No. 175,784. Patented April 4, 1876.
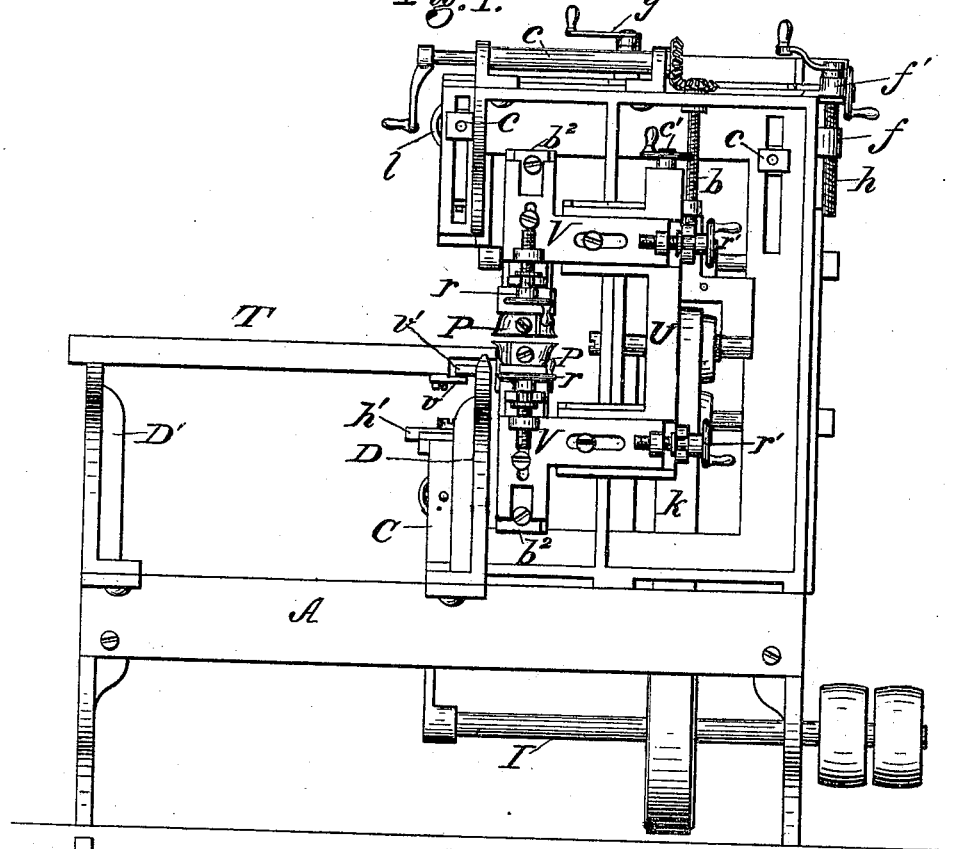
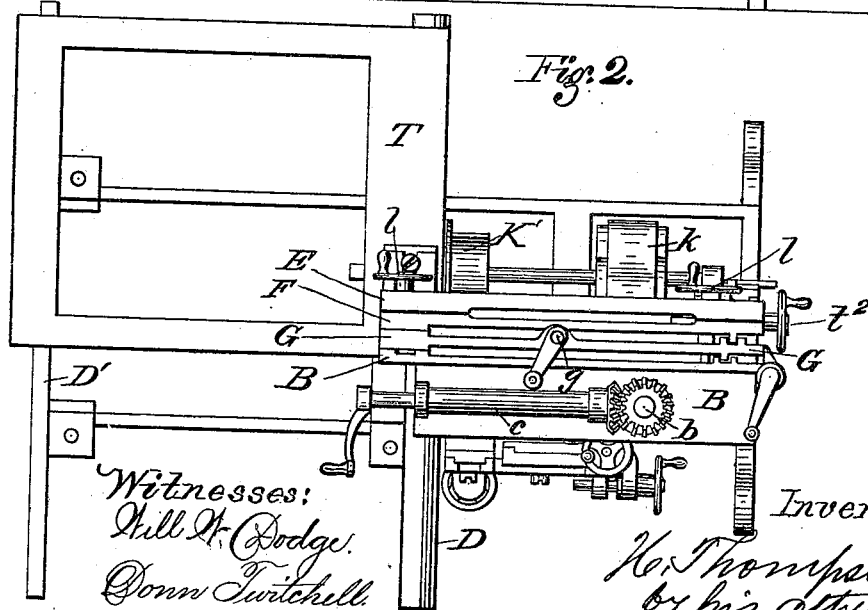
Witnesses:
Will W. Dodge.
Donn Twitchell.
Inventor:
H. Thompson
by his attys
Dodge&Son.

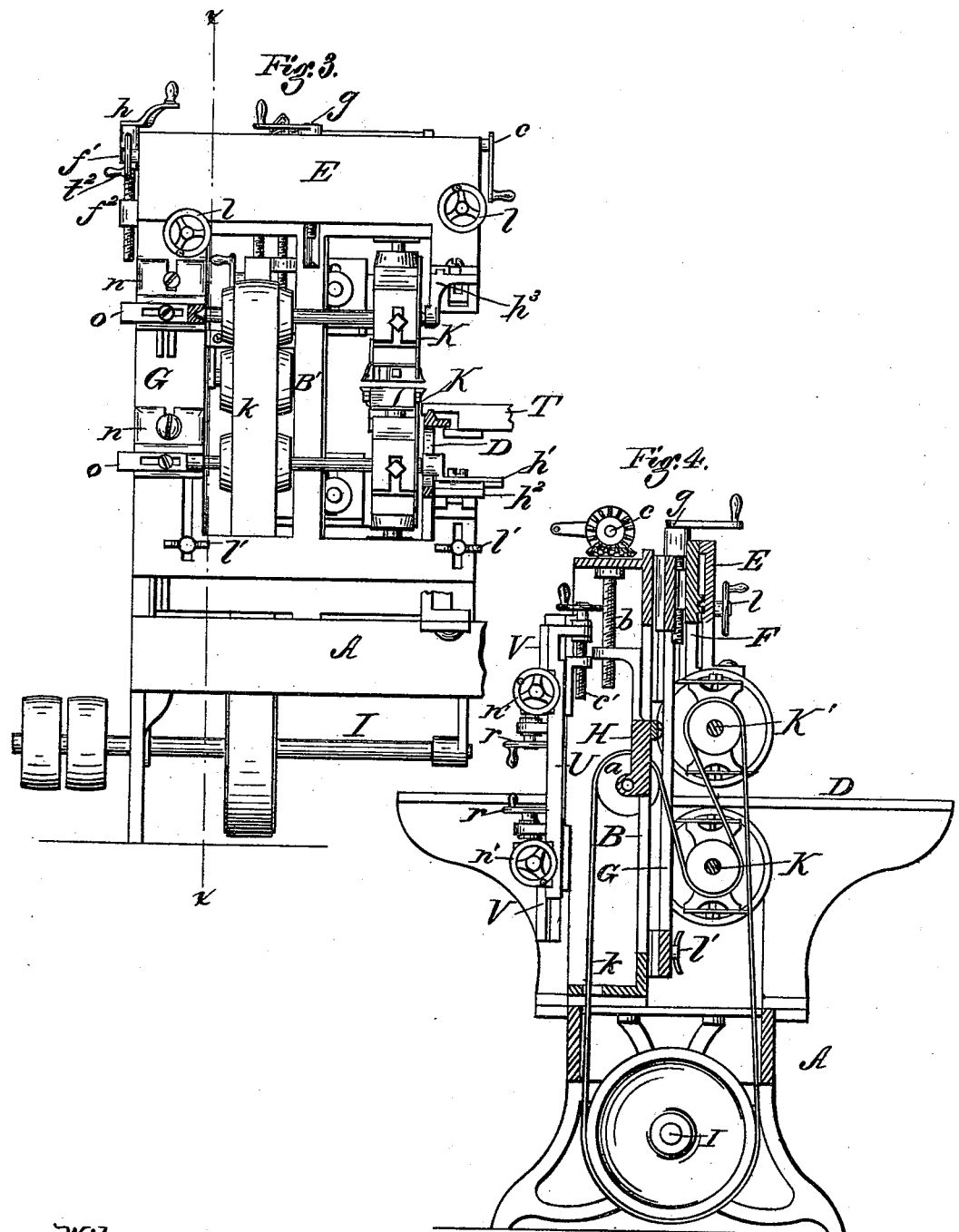

3 Sheets—Sheet 3.

H. THOMPSON.
TENONING MACHINE.

No. 175,784. Patented April 4, 1876.

WITNESSES:
Will W. Dodge
Donn Twitchell

INVENTOR:
H. Thompson,
by his atty
Dodge & Son

UNITED STATES PATENT OFFICE.

HIRAM THOMPSON, OF WORCESTER, MASSACHUSETTS.

IMPROVEMENT IN TENONING-MACHINES.

Specification forming part of Letters Patent No. 175,784, dated April 4, 1876; application filed August 5, 1875.

*To all whom it may concern:*

Be it known that I, HIRAM THOMPSON, of Worcester, in the county of Worcester and State of Massachusetts, have invented certain Improvements in Tenoning-Machines, of which the following is a specification:

My invention relates to tenoning-machines; and the invention consists in a novel construction of the frame, and the various parts, whereby the cutters, with their bearings, can be adjusted with rapidity, accuracy, and ease, as hereinafter more fully described.

Figure 5:
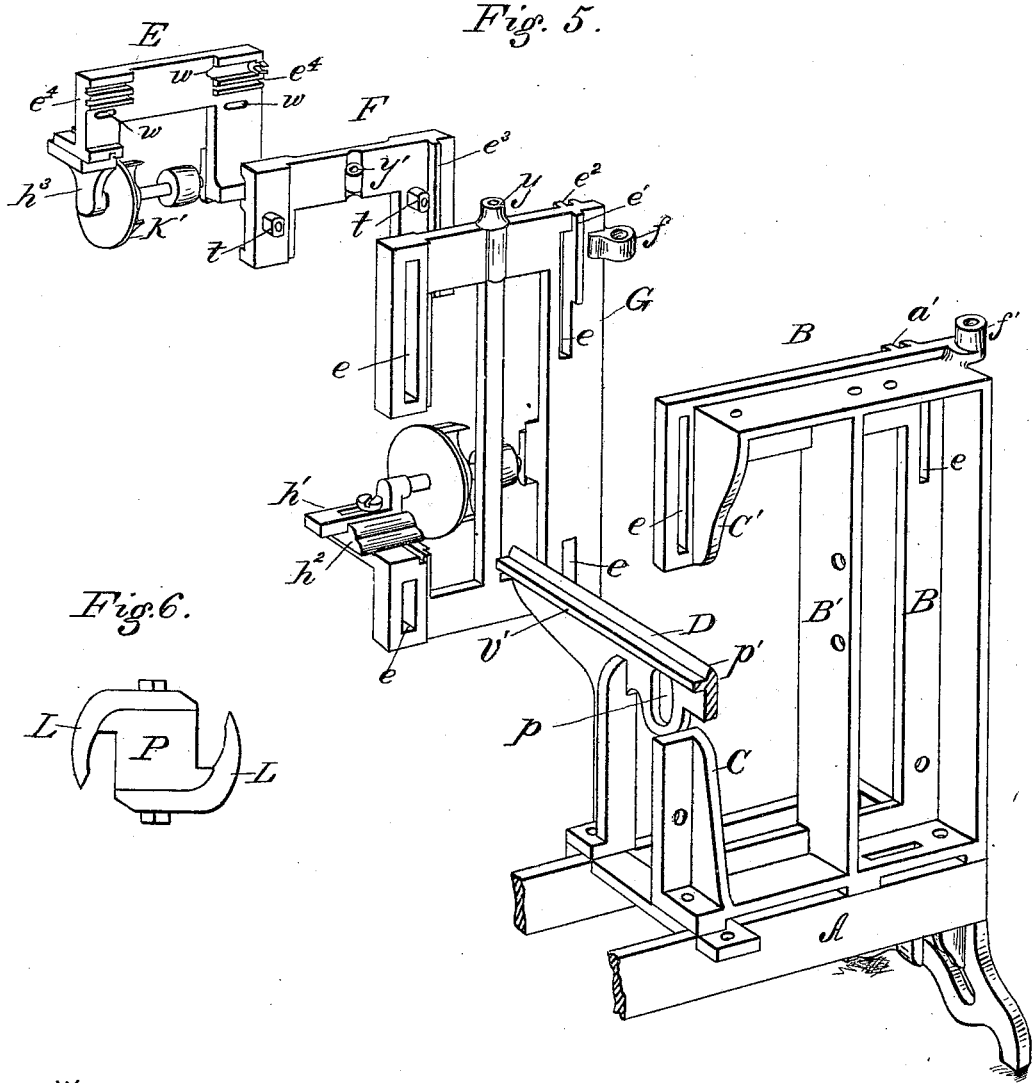

Figure 1 is a rear elevation of the machine complete. Fig. 2 is a top plan view; Fig. 3 a front elevation, and Fig. 4, a transverse vertical section on the line $x\ x$ of Fig. 3; Fig. 5, a perspective view of parts shown detached; and Fig. 6 a top plan view of a cutter-head with the cutters attached.

In constructing my improved machine, I first provide a bed or main frame, A, as shown in the several figures. I then construct an upper frame, B, of the form shown detached in Fig. 5. This frame B, to which all the working parts and their bearings are to be attached, is made with a central vertical bar, $B'$, and with two projecting brackets, C and $C'$, as shown clearly in Fig. 5. I then construct another frame or plate, G, which, as shown in Figs. 2, 3, and 4, is fitted against the front side of the frame B, they being provided with vertical grooves and ribs $a'$ and $e^1$, which serve as ways to cause the frame G to move in a true vertical line. The frame G is also provided at each corner with a vertical slot, $e$, and corresponding slots are also made in the two upper corners of the frame B, as shown in Fig. 5, through which screws $l$ and $l'$ extend for the purpose of holding the two frames together, the two screws $l$ at the top passing through both frames, and having nuts $c$ on their rear ends, as shown in Fig. 1, the screws $l'$ screwing into holes in the frame B.

To the lower portion of the frame G are secured the boxes or bearings for the lower cutter-head K, as shown in Fig. 5, the inner end of the shaft having its bearing in a box, $h^1$, which is adjustable longitudinally on another plate, $h^2$, which is adjustable transversely, both being provided with ways or guides by which they are caused to move with accuracy when adjusted. The opposite end of this shaft is made conical, and has its bearing in longitudinally-adjustable box $o$, which, in turn, is mounted in ways upon a plate, $n$, that is made adjustable vertically, as shown in Fig. 3.

The frame G is adjusted vertically on the frame B by means of a screw-rod, $h$, shown at the left-hand corner of Fig. 3, it having its bearing in a bracket, $f^1$, projecting from the edge of frame B, as shown in Fig. 5, and working in a corresponding screw-threaded bracket, $f^2$, on the edge of frame G, as represented in Fig. 3.

Upon the front of frame G, at its upper end, is fitted a plate, F, which is provided with a rib, $e^3$, fitting in a corresponding groove, $e^2$, on frame G, as shown in Fig. 5. On the plate F are also two studs, $w$, which fit in the slots $e$ of frame G, there being holes in these studs through which the screw-bolts $l$ pass. This plate F is adjusted vertically on the frame G, by means of a screw-rod, $g$, which, as shown in Figs. 3 and 4, is provided with a crank, it having its bearing in a socket, $y$, on the top of frame G, and engaging in a stud or eye, $y'$, on the side of plate F, these latter being shown in Fig. 5.

I also provide still another plate, E, which has transverse grooves $e^4$, fitting corresponding ribs on the face of plate F; it also having transverse slots $w$, through which the screw-rods $l$ pass. (See Fig. 5.) This plate F is adjusted transversely or edgewise by a screw, $t^2$, Fig. 2, which engages in a sleeve, $e^4$, shown in Fig. 5, it having a bearing in a stud (not shown) on the adjoining face of plate E.

On this outside plate E I mount the upper cutter-head $K'$, its shaft being mounted at its outer end in sliding boxes $o$ and $n$, the same as the lower one, and as shown in Fig. 3, its inner end being mounted in a bracket or box $h^3$, Figs. 3 and 5, which is made to slide or be adjusted transversely of the machine. These two cutter-heads K and $K'$ are both driven by a single belt, $k$, from a driving-shaft, I, underneath the main frame A, as shown more clearly in Fig. 4. Within the frame B is mounted a vertically-sliding frame, H, carrying a pulley, $a$, over which the belt $k$ passes, this frame H, with its pulley $a$, being adjusted by a screw-rod, $b$, which, in turn, is operated through bevel-gear, by a crank-shaft, $c$, as shown in Figs. 1, 2, and 4. As clearly shown in Fig. 4, when the frame H, with its pulley $a$, is raised, the belt will be tightened, and by lowering the frame and pulley it will be loosened.

On the back side of the frame B, I mount two cope cutter-heads, P P, as shown in Fig. 1, their shafts being arranged vertically, at right angles to the others, on the front. The shafts of these cutters are each supported on a plate or frame, $b^2$, which is made to slide vertically on another plate, V, by a screw, $r$, as shown in Figs. 1 and 4, the plates V being in like manner secured to a plate, U, on which they are moved horizontally by screws $r'$, this plate U being adjusted vertically by a screw, $c'$, at its upper end. It will thus be seen that these cutter-heads P can both be adjusted vertically together by means of the screw $c'$, and that each can be adjusted separately vertically by the screws $r$, and each horizontally separately, by the screws $r'$, it being understood that each of these plates is so fitted to the one on which it bears and moves, that it is prevented from moving in any other than a right line. As shown in Fig. 1, these plates are held together by screws working in slots in the plates V.

Upon the main frame A I secure two uprights, D and D', as shown in Figs. 1, 4, and 5, to form ways, on which the table T that supports the work moves. The inner one, D, has an opening, $p$, for the lower cutter-head shaft to pass through, it being supported in the box $h'$ on the arm C of the frame G, which projects through under the upright or way D, as shown in Figs. 1 and 3. This way D is provided on its upper edge with a V-shaped rib, $p'$, which fits in a corresponding groove cut in the under side of the table. It has also a laterally-projecting rib or flange, $v'$, under which a gib, $v$, secured to the under side of the table, engages, thus holding the table down firmly on its ways, and insuring its moving true and accurately.

By this construction of these parts the lower cutter-head shaft is supported at its outer end outside of the cutter-head, and at the same time the way is left with an unbroken rib for the table to move on, and also a continuous or unbroken flange for the gib that holds the table down to work against.

By this method of constructing and mounting the several parts it will be seen that the cutter-heads, which are the only parts that require to be adjusted, can be adjusted in every possible direction. Each cutter-head shaft can be moved lengthwise or vertically independently of the other; or either end of either shaft can be moved up or down alone. So, too, the upper cutter-head can be adjusted bodily up or down by the screw $g$, and can also be moved bodily endwise by the screw $t^2$, in addition to which both cutter-heads can be raised or lowered together by moving the frame G by means of the screw $h$.

Figure 6:
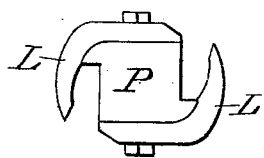

As shown in Fig. 6, the cope cutter-heads P I provide with cutters L, the outer surface of which, for some distance from the point backward, is made to describe the arc of a circle, so that they may be sharpened by grinding their inner faces, by which their size is not altered.

It will readily be seen that a machine constructed on this plan is capable of being quickly adjusted for all sizes and kinds of work within its capacity, and that the parts can be adjusted with the greatest accuracy.

Whenever the cope-cutters are not required the frame U, with the cutter-heads and all the parts relating to them, can be detached by simply removing the two screws or bolts and unscrewing the adjusting-screw $c'$ at the top.

Having thus described my invention, what I claim is—

1. The frame B, constructed with the central support B' and the projecting brackets C and C', in combination with the cutter-heads K and K', the shafts of which are supported in bearings attached to the brackets outside of the cutter-heads, substantially as described.

2. In combination with the frame B, the frame G, having the two cutters-heads K and K' mounted thereon, and provided with the guides and adjusting-screw $h$, all constructed to operate substantially as described, whereby the two cutter-heads can be raised or lowered without varying their relative positions.

3. The combination of the frames or plates E, F, G, and B, the former having the upper cutter-head mounted thereon, and said parts being constructed and provided with the guides and adjusting-screws, as set forth, whereby the upper cutter-head can be adjusted vertically or longitudinally independent of the other or lower cutter-head, as described.

4. The sliding frame H, with the pulley $a$ arranged in relation to the cutter-head shafts, as shown, in combination with the adjusting-screw $b$ and crank-shaft $c$, provided with the bevel-gear, substantially as described.

5. The table support or way D, provided with the rib $p'$, flange $v'$, and the opening $p$, whereby the lower cutter-head is supported at its outer end, and an unbroken way and rib for the table and its gib are provided, as set forth.

6. The detachable frame or plate U, having the plates V and $b^2$ attached thereto, so as to be adjusted at right angles to each other, with the cope-cutters P mounted on the latter, the whole being secured to the frame B and provided with the adjusting-screws $c'$ and $r$, all arranged to operate substantially as shown and described.

HIRAM THOMPSON.

Witnesses:
GEORGE E. WOOD,
SAML. J. WAITE.